United States Patent

[11] 3,604,190

[72] Inventor Jimmy B. Wray
 Ft. Belknap Rd., Graham, Tex. 76046
[21] Appl. No. 13,074
[22] Filed Feb. 20, 1970
[45] Patented Sept. 14, 1971

[54] PECAN PICKER
 8 Claims, 5 Drawing Figs.
[52] U.S. Cl. .................................................. 56/328 R,
 294/19 A, 214/356
[51] Int. Cl. ..................................................... A01d 51/00
[50] Field of Search .......................................... 56/328, 27;
 214/353, 357; 294/15, 19 A

[56] References Cited
 UNITED STATES PATENTS
2,749,697 6/1956 Poche ........................... 56/328
2,812,871 11/1957 Woodall ...................... 214/356
3,215,293 11/1965 Kelly et al. .................. 214/356
3,227,298 1/1966 Shoemaker .................. 214/356

Primary Examiner—Russell R. Kinsey
Attorneys—Clarence A. O'Brien and Harvey B. Jacobson ABSTRACT: A rotary article pickup assembly for rolling over the ground to collect, pick up and retain small generally round articles lying upon the ground. The assembly includes at least one journaled pickup member for rolling along the ground while being urged downwardly relative to the ground and the pickup member defines a plurality of generally U-shaped members disposed in a circle about the center axis of rotation of the pickup member and the U-shaped members open toward the center axis and are disposed generally in radial planes of the center axis. The U-shaped members are stiff but resiliently supported for relative movement of the radial outermost portions of adjacent U-shaped members toward and away from each other and the normal spacing between the outer ends of adjacent U-shaped members is such that rolling engagement of the pickup member over a small generally round article such as a nut lying upon the ground will cause the outer ends of the adjacent U-shaped members to be spread apart for the passage of the nut therebetween and into the annular area about the center axis bound by the U-shaped members.

Jimmy B. Wray
INVENTOR

BY Clarence A. O'Brien
and Harvey B. Jacobson
Attorneys

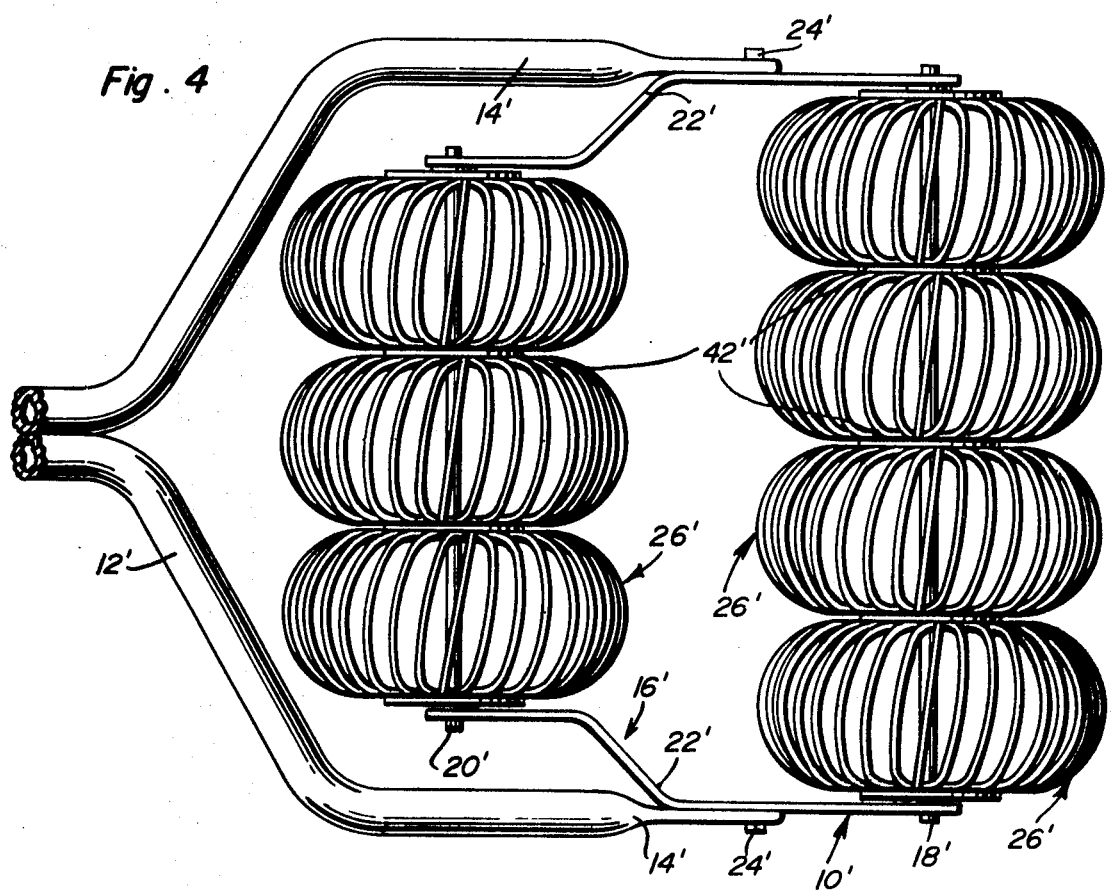
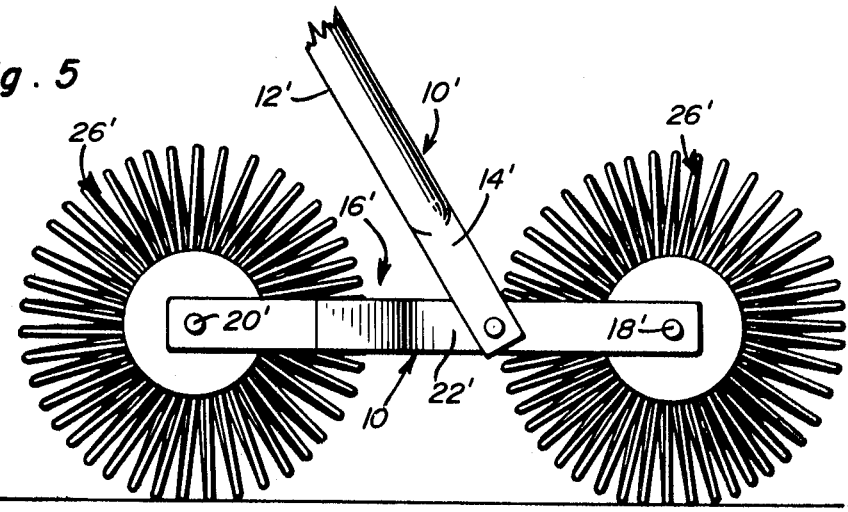

PECAN PICKER

The pecan picker of the instant invention is designed to collect, pick up and retain pecan nuts lying upon the ground.

Pecan nuts are harvested most economically by shaking or vibrating the trunk or limb portions of a pecan tree so that the nuts on the tree fall to the ground. There are existing machines for shaking the trunk or limb portions of a pecan tree and also machines which may be erected about a pecan tree and onto which nuts falling from the tree drop for collecting. While the machines or manually operable devices existing for shaking or vibrating the trunk and limb portions of a pecan tree may be purchased and operated at a reasonably low cost, the machines which have been developed to be erected around the base of a pecan tree for catching and collecting pecan nuts which fall from the tree before they impact with the ground are quite expensive, complex and require considerable maintenance.

It is accordingly the main object of this invention to provide a means whereby pecan nuts lying upon the ground may be quickly retrieved from the ground with little effort by the use of a device which may be marketed at an extremely low cost in comparison to heavy complex machinery designed to collect nuts as they fall from a nut tree.

Another object of this invention, in accordance with the immediately preceding object, is to provide a device for picking up or retrieving nuts from the ground that may be operated by inexperienced and inexpensive labor.

Yet another object of this invention is to provide an apparatus for retrieving nuts laying upon the ground and constructed in a manner whereby a large number of pecan nuts or the like may be retrieved from the ground before it is necessary to dump the retrieved nuts from the nut-gathering apparatus.

A final object of this invention to be specifically enumerated herein is to provide a pecan picker which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is a fragmentary top plan view of a second form of pecan picker constructed in accordance with the present invention; and FIG. 5 is a fragmentary side elevational view of the assemblage illustrated in FIG. 4.

Figure 1:
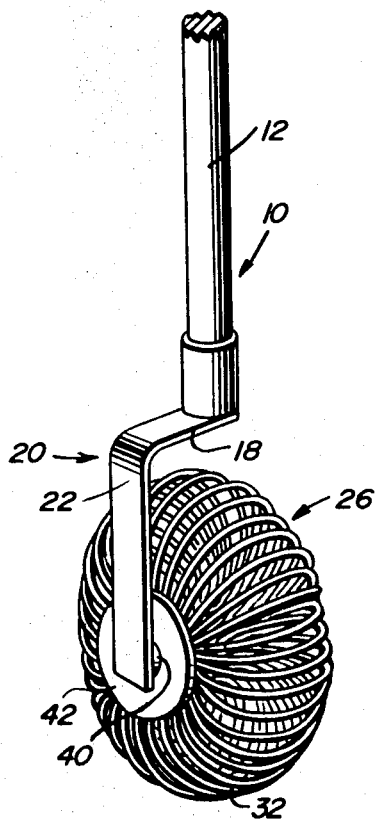
FIG. 1 is a fragmentary perspective view of a first form of pecan picker constructed in accordance with the present invention.
Figure 2:
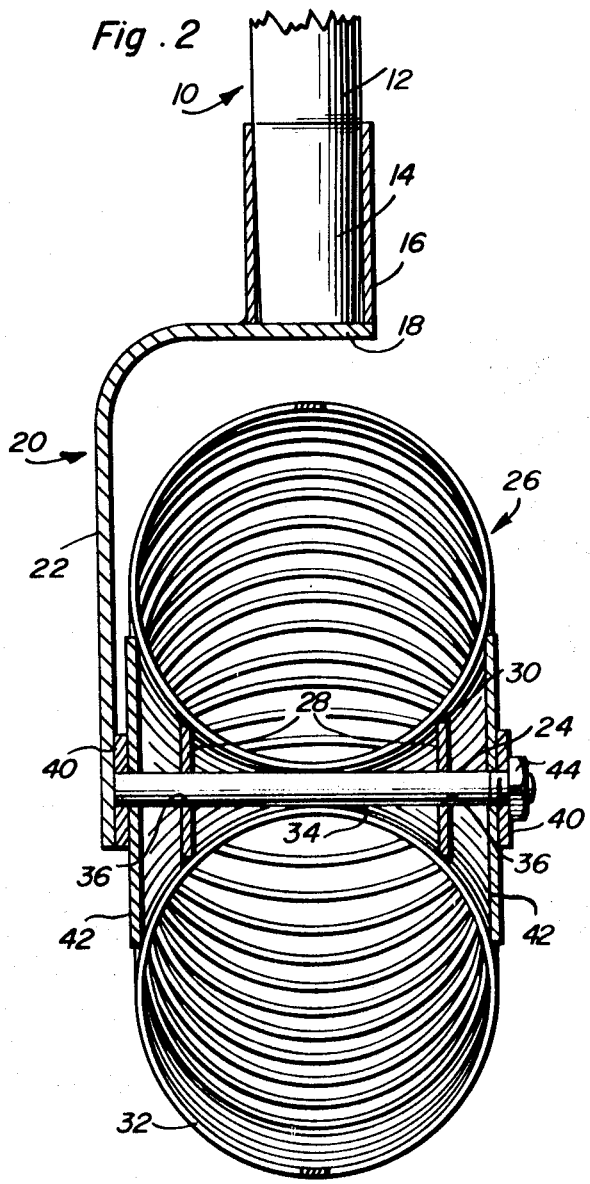
FIG. 2 is a fragmentary enlarged vertical sectional view taken substantially upon a plane passing through the center of the embodiment illustrated in FIG. 1.

Referring now more specifically to the drawings, the numeral 10 generally designates the first form of pecan picker. The pecan picker 10 includes an elongated handle 12 which may be of any desired length and constructed of any suitable material. When the pecan picker 10 is in use, the handle 12 is disposed in an upright position and the lower end 14 of the handle 12 is secured within a socket defining sleeve 16 carried by the upper short horizontal leg 18 of an inverted L-shaped mount referred to in general by the reference numeral 20.

The amount 20 includes a depending long leg 22 from one side of which a rigidly supported outwardly projecting horizontal axle pin 24 is carried.

An elongated coil spring referred to in general by the reference numeral 26 is provided and bent into an annulus. The opposite ends of the coil spring 26 are secured together in any convenient manner and a pair of opposite side registered support washers 28 have peripherally spaced portions thereof secured, as by welding 30, to each of the convolutions 32 of the spring 26. The inner extremities of the convolutions 32 form a passage through the annulus defined by the coil spring 26 and the passage 34 is of a diameter slightly larger than the bores 36 formed through the centers of the washers 28, the inner extremities of the convolutions 32 and the apertures formed centrally through the washers 28 defining a hub structure journaling the spring 26 on the axle pin 24.

A first antifriction washer 40 is disposed on the base end of the axle pin 24 adjacent the long leg 22 and a second larger diameter washer 42 is then placed over the outer end of the axle pin 24 and slid inwardly against the washer 40. Thereafter, the coil spring 26 and the washers 28 are slid onto the outer end of the axle pin 24 after which an outer large washer 42 is slipped onto the outer end of the pin 24. Finally, a second antifriction washer 40 is disposed on the axle pin 24 outwardly of the outer washer 42 and a nut 44 is threadedly engaged on the outer end of the pin 24. In this manner, the coil spring 26 is rotatably journaled on the axle pin 24.

In operation, the handle 12 is held in a forwardly and downwardly inclined position by one or two hands and downward pressure is applied to the handle 12 as the coil spring 26 is rolled over the surface of the ground.

Figure 3:
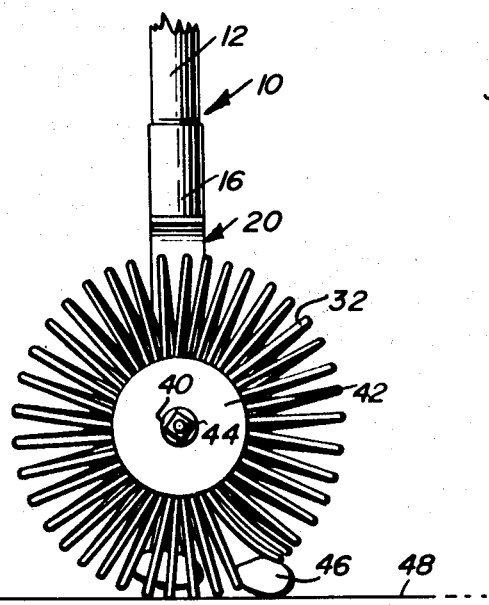
FIG. 3 is a fragmentary side elevational view of the pecan picker as seen from the right side of FIG. 1 and with the pecan picker in operation retrieving pecan nuts laying upon the ground.

With attention now invited more specifically to FIG. 3 of the drawings, it may be seen that when a nut 46 lying upon the ground 48 is encountered by the coil spring 26, adjacent convolutions 32 of the coil spring 26 will be spread apart to receive the nut 46 therebetween and to thereby receive the nut 46 into the annulus defined by the coil spring 26.

The outer portions of the convolutions 32 define generally U-shaped members and it is to be noted that the rotary member defined by the coil spring 26 could be constructed of a plurality of U-shaped members suitably supported from the washers 28. However, by utilizing a coil spring such as coil spring 26 to form such U-shaped members, a single unitary readily available element may be utilized to define the U-shaped members.

With attention now directed more specifically to FIGS. 4 and 5 of the drawings, there may be seen a modified form of pecan picker referred to in general by the reference numeral 10'. The picker 10' includes a bifurcated handle 12' between whose furcations 14' a frame referred to in general by the reference numeral 16' is oscillatably supported. The frame 16' includes a pair of axle pins 18' and 20' interconnected at adjacent ends by means of frame members 22' which are pivotally supported from the furcations 14' by means of pivot fasteners 24'. The pecan picker 10' includes a plurality of coil springs 26' corresponding to the coil springs 26 with four coil springs 26' being mounted upon the pivot shaft or pin 18' and three coil springs 26' mounted on the axle pin or shaft 20'.

The three coil springs 26' mounted on the axle pin 20' are aligned with the spacings between adjacent pairs of coil springs 26' mounted on the axle pin 18' and it will be noted that the coil springs 26' are mounted on the axle pins 18' and 20' in the same manner in which the coil spring 26 is mounted on the axle pin 24. However, only a single large washer 42' is utilized between each pair of adjacent coil springs 26'.

Of course, the pecan picker 10' is operable in substantially the same manner as the pecan picker 10 with the exception that the pecan picker 10' will pick up pecan nuts along a wider path than the pecan picker 10 as the pecan picker 10' is rolled over the ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. A rotary article pickup assembly for rolling over the ground, said pickup assembly including a support, a hub portion journaled from said support for rotation about a horizontal axis, and a plurality of generally U-shaped members supported from and disposed in a circle about said hub portion with the U-shaped members opening toward and disposed generally in radial planes of said axis, said U-shaped members being stiff but resiliently supported from said hub portion for relative movement of the radial outermost portions of adjacent U-shaped members toward and away from each other, whereby the radial outermost portions of adjacent U-shaped members may spread apart upon engagement with a small article disposed on the ground over which said U-shaped members are being rolled for the reception of the small article therebetween and into the confines of the annular area about said hub portion bound by said U-shaped members, said U-shaped members comprising the outer portions of integral convolutions of a coil spring bent into an annulus and having its opposite ends joined together in end aligned relation.

2. The combination of claim 1 wherein the outer ends of said U-shaped members are generally semicircular in configuration.

3. The combination of claim 1 wherein said hub portion includes the inner portions of the convolutions of said spring and a pair of axially spaced washers received within the recesses defined on opposite sides of said spring by the inner portions of said convolutions, spaced peripheral portions of said washers being secured to the adjacent sections of the inner portions of said convolutions.

4. The combination of claim 1 wherein said pickup assembly includes a plurality of hub portions, said hub portions being arranged in parallel spaced apart sets of aligned hub portions, a support frame said sets of hub portions being journaled from said support frame, said frame being oscillatably supported from said support for oscillation about an axis generally paralleling said hub portions and spaced between said sets of hub portions, said hub portions each including a plurality of said U-shaped members, the hub portions of one set being axially staggered relative to the other set of hub portions.

5. The combination of claim 4 wherein the outer ends of said U-shaped members are generally semicircular in configuration.

6. The combination of claim 1 wherein said support includes an inverted L-shaped member provided with horizontal and upstanding leg portions, and elongated handle having one end thereof secured to said horizontal leg and generally paralleling and extending away from said upstanding leg, an axle pin projecting outwardly from the lower end portion of said upstanding leg beneath the horizontal leg, said hub portion being journaled on said axle pin.

7. The combination of claim 6 wherein said hub portion includes the inner portions of the convolutions of said spring and a pair of axially spaced washers received within the recesses defined on opposite sides of said spring by the inner portions of said convolutions, spaced peripheral portions of said washers being secured to the adjacent sections of the inner portions of said convolutions.

8. A rotary article pickup assembly for rolling over the ground, said pickup assembly including a support, an elongated coil spring, said spring being bent into an annulus and journaled from said support for rotation about an axis extending centrally through the area bounded by the inner periphery of the annulus and disposed generally normal to the medial plane of the annulus, the opposite ends of said spring being secured together in end aligned relation, whereby the spring is maintained in an annular configuration.